Feb. 21, 1939.  W. O. NORMANDIN  2,147,855
VENTILATION CONTROL MEANS FOR MOTOR VEHICLES
Filed Jan. 25, 1937
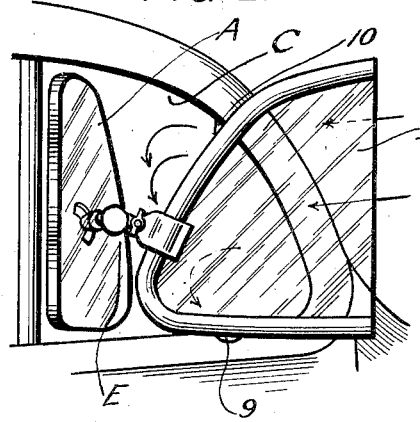
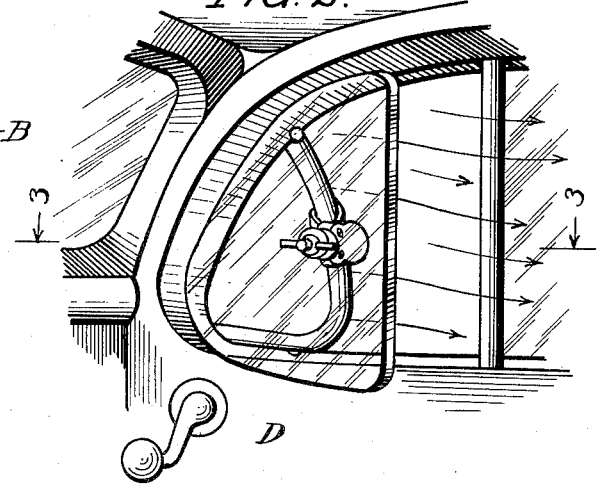
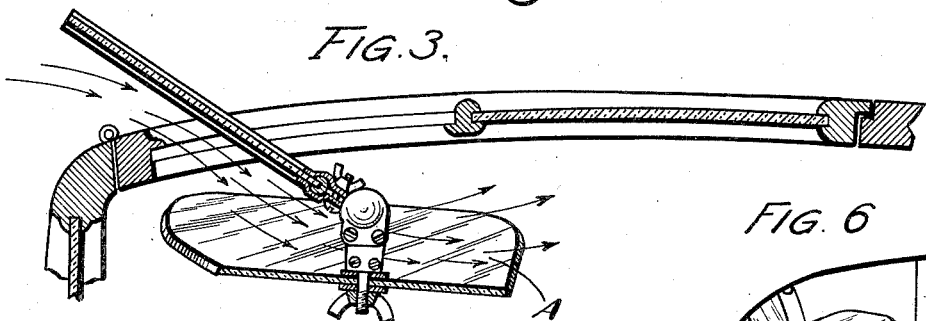
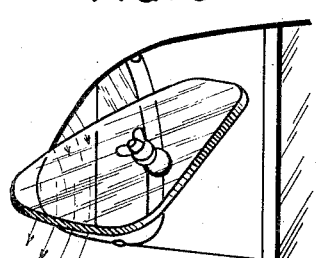
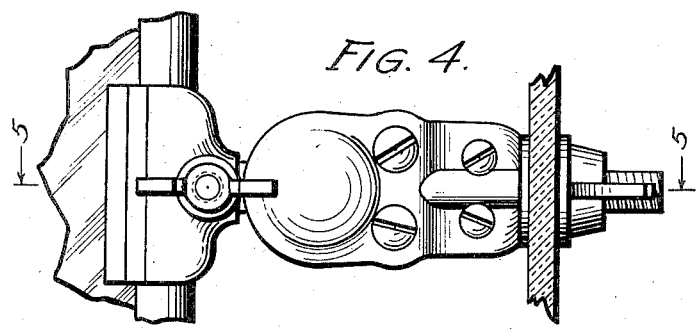
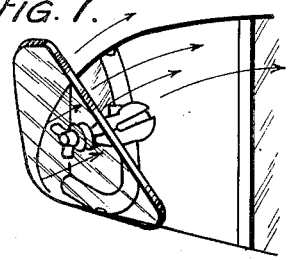
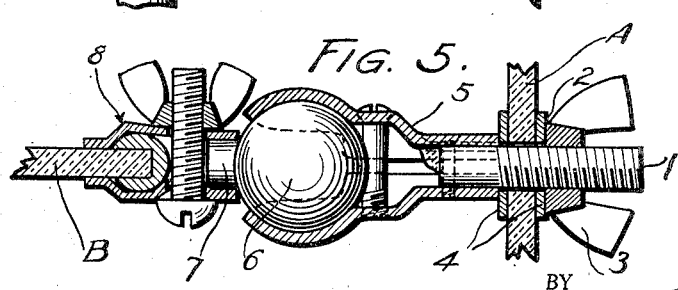
INVENTOR.
William O. Normandin
BY
ATTORNEY.

Patented Feb. 21, 1939

2,147,855

UNITED STATES PATENT OFFICE 2,147,855

VENTILATION CONTROL MEANS FOR MOTOR VEHICLES

William O. Normandin, Los Angeles, Calif.

Application January 25, 1937, Serial No. 122,124

4 Claims. (Cl. 296—44)

This invention relates to and has for an object the provision of ventilation control means for motor vehicles whereby the flow of air into the body of a motor vehicle may be deflected in the desired direction to suit the occupants of the vehicle or the conditions at hand.

An important object of the invention is to provide a motor vehicle ventilation control means wherein a window of the vehicle has at least two sections relatively rotatably adjustable and which cooperate so that upon selective adjustment thereof the flow of air into the interior of the vehicle may be controlled as to direction as desired, it being the intention to provide an effective ventilation control whereby, for example, currents of air may be directed upwardly and rearwardly so as to cool and ventilate the upper interior portions of the vehicle body, or air currents may be directed downwardly and forwardly or downwardly and rearwardly and in other directions for the purposes above mentioned.

Another object of the invention is to provide ventilation control means of the character described wherein a pair of relatively adjustable transparent wings or sections are arranged whereby one forms a support for the other, and said wings are subject to ready adjustment to deflect the air flow into the body of the motor vehicle in the desired direction.

A further object is to provide ventilation control means which may be formed or provided in a motor vehicle by the attachment to the rotatably adjustable transparent ventilating section or pane of the factory-equipped window of a motor vehicle, or a transparent deflector wing or section which is readily adjustable relative to said ventilating section for controlling the direction of the flow of air currents into the vehicle body as desired, thus making possible the provisions of this invention through the use of a deflector accessory comprising said deflector wing and its mounting means.

An additional object of this invention is to provide ventilation control means of the character described which is movable freely through the window opening, upon rotative adjustment of the rotary ventilation pane, such as now generally used in modern motor vehicles, said ventilation means also permitting the vehicle door to be opened and closed without interference or disturbing the adjustment of said means.

I have shown in the accompanying drawing a preferred form of outlet box embodying my invention, subject, however, to modification, within the scope of the appended claims, without departing from the spirit of my invention.

In the drawing:

Fig. 1 is a perspective view of the right front portion of the body of a motor vehicle showing my ventilation motor means associated therewith;

Fig. 2 is a fragmentary perspective of the interior of the corner of the vehicle body shown in Fig. 1, and particularly showing the ventilation control means;

Fig. 3 is a horizontal sectional view taken through the ventilating means and the corner of the vehicle body, as shown in Figs. 1 and 2;

Fig. 4 is an enlarged elevation of the adjustable supporting means and clamp for the deflector section;

Fig. 5 is a sectional view of the means shown in Fig. 4;

Figs. 6 and 7 are perspective views showing the deflector in position to direct air currents forwardly and downwardly and rearwardly and upwardly respectively.

One form of ventilation control means of this invention may comprise a transparent deflector section or wing A made of glass or other transparent material, and preferably substantially of the same shape as the rotatably adjustable ventilation section B, such as found in the front windows of the modern motor vehicle. In accordance with this invention, the deflector section A is adapted to be mounted upon the motor vehicle for adjustment relative to the ventilation section B whereby said sections will cooperate to deflect the flow of the air into the vehicle in the desired direction. It will be noted that the deflector element is adapted to be disposed interiorly of the vehicle body, and is constructed and arranged so that it may move through the window opening C with the adjustable section B, upon adjustment of the latter. Furthermore, it is important that the member A, when in place, will not interfere with the normal operation of the door D, nor lose its adjustment when said door is opened and closed. It is, therefore, seen that the provisions of this invention are effected by the use of the deflector wing A and an adjustable attaching means E, the parts A and E, therefore, comprising an accessory, subject to ready attachment and cooperative use with present-day automobile structure found in the majority of the motor vehicles. It is thus seen that the invention comprises a window having at least two transparent sections relatively adjustable whereby to deflect the flow of air into the motor vehicle in the desired direction at will, and to provide an efficacious no draft ventilation system.

As here shown, I mount the deflector wing A on the ventilation wing B by securing the means E to the front edge of the wing B between the upper and lower ends of the latter. It will be noted that the means E is affixed to the approximate central portion of the wing A whereby the latter may be angularly disposed as desired to deflect the air flow rearwardly downwardly or upwardly, or forwardly downwardly or upwardly, and in various other directions as desired to suit the occupants of the vehicle or the conditions at hand. It may be desirable to cool the top of the vehicle in hot weather by deflecting the air currents upwardlys and rearwardly along the inner side of the top, or forwardly and upwardly along the front portion of the top, or in any other direction as desired. It should be noted that the deflector wing A makes possible the inflow of the desired amount of air without exposing the occupants of the vehicle directly to said incoming air or to drafts.

The means E may be constructed in any suitable manner, provided that it will constitute an adjustable support for the deflecting wing A and provide for attachment by clamping to an edge of the ventilation section B. As here shown, this means comprises a threaded member 1 extended through an opening 2 in the deflector A, approximately at the central portion of said deflector, and held in place by a wing nut 3 and suitable washers 4. This screw 1 is fixed to a clamp 5 rotatably holding a ball 6 to the stem 7, to which a clamp 8 is affixed. This provides a universal joint so that when the clamp 8 is secured to an edge of the wing B, the deflector A may be turned in any desired position and disposed at various angles to accomplish the deflecting of the air flow, as hereinbefore described.

In the present-day style of ventilation windows for automobiles, the front section B is mounted on vertical axes indicated at 9 and 10, and the front edge of said section or wing is movable inwardly of the window opening so as to dispose the wing at an angle to accomplish the necessary ventilation. It is to this inner edge of the wing that my deflector A is clamped, as here shown, with the deflector disposed so that it may, if desired, be moved through the window opening. It is noted that the deflector is substantially at the same height as the ventilation section B of the window so that the air currents directed inwardly by the member B will strike against and may be deflected as desired by the member A, depending upon the position of the latter.

It will now be seen that the ventilation control means of my invention is of simple and inexpensive form and capable of being readily incorporated without requiring the services of a mechanic or skilled workman whereby to provide the advantages of this invention with a greater nicety of ventilation control than heretofore possible with no draft ventilating means for motor vehicles.

I claim:

1. A ventilation control means for motor vehicles comprising the combination with a motor vehicle body having a window provided with a transparent ventilation section adjustable in said window to present one edge within the vehicle body and the other edge extending outwardly through the window opening of a transparent deflector section, and means for adjustably mounting said transparent deflector section adjacent and inwardly spaced from the inner edge of said ventilating section, said means providing a universal adjustment of said deflector section relative to the ventilation section.

2. A ventilation control means for a motor vehicle having a window opening provided with a transparent ventilator pane adjustable to move the upright edges thereof into and out of said opening, including a transparent deflector pane adapted to cooperate with said ventilator pane to control the flow of air currents entering and discharging thru said opening, and mounting means for universally adjustably supporting said deflector pane in cooperative relation to said ventilator pane, including pivotally connected members, means for securing one of said members to said deflector pane at a point spaced inwardly of the margins thereof and means for bodily adjustably supporting the other of said members at a point adjacent to the rear upright edge of said ventilator pane, whereby said deflector pane may be disposed in various positions relative to said ventilator pane and said opening.

3. A ventilation control means for a motor vehicle having a window opening provided with a transparent ventilator pane adjustable to move the upright edges thereof into and out of said opening, comprising a transparent deflector pane adapted to cooperate with said ventilator pane to control the flow of air currents entering and discharging thru said opening, and mounting means for adjustably supporting said deflector pane in cooperative relation to said ventilator pane, including pivotally connected members, means for securing one of said members to and at a point spaced inwardly of the margin of said deflector pane, and means for supporting the other of said members at a point adjacent to the rear upright edge of said ventilator pane, whereby said deflector pane may be disposed in various positions relative to said ventilator pane and said opening.

4. A ventilation control means for a motor vehicle having a window opening provided with a transparent ventilator pane adjustable to move the upright edges thereof into and out of said opening, including a transparent deflector pane adapted to cooperate with said ventilator pane to control the flow of air currents entering and discharging thru said opening, and mounting means for universally adjustably supporting said deflector pane in cooperative relation to said ventilator pane, including pivotally connected members, means for securing one of said members to and at a point spaced inwardly of the margin of said deflector pane, and means for detachably clamping the other of said members upon an edge of said ventilator pane.

WILLIAM O. NORMANDIN.